(12) United States Patent
Gancarcik et al.

(10) Patent No.: US 7,085,591 B2
(45) Date of Patent: Aug. 1, 2006

(54) PDA ENABLED TELEPHONE

(75) Inventors: Ed Gancarcik, Ottawa (CA); David Ross, Nepean (CA); Jean-Marc Seguin, Stittsville (CA); Alain Chamsi, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 505 days.

(21) Appl. No.: 10/055,150

(22) Filed: Jan. 23, 2002

(65) Prior Publication Data
US 2002/0107045 A1    Aug. 8, 2002

(30) Foreign Application Priority Data
Jan. 27, 2001    (GB) ................................ 0102139.3

(51) Int. Cl.
*H04Q 7/20* (2006.01)
*H04M 1/00* (2006.01)

(52) U.S. Cl. .............................. 455/556.2; 455/556.1

(58) Field of Classification Search ............. 455/556.1, 455/556.2, 575.1, 550.1, 90.1
See application file for complete search history.

(56) References Cited

U.S. PATENT DOCUMENTS

| | | | |
|---|---|---|---|
| 5,497,339 A | 3/1996 | Bernard | |
| 5,522,089 A | 5/1996 | Kikinis et al. | |
| 5,675,524 A | 10/1997 | Bernard | |
| 5,719,936 A | 2/1998 | Hillenmayer | |
| 5,797,089 A | 8/1998 | Nguyen | |
| 6,128,475 A | 10/2000 | Wicks et al. | |
| 6,266,539 B1 | 7/2001 | Pardo | |
| 6,584,490 B1 * | 6/2003 | Schuster et al. | ............ 709/200 |
| 6,647,103 B1 * | 11/2003 | Pinard et al. | ........... 379/110.01 |
| 6,738,643 B1 * | 5/2004 | Harris | ...................... 455/556.1 |

FOREIGN PATENT DOCUMENTS

| | | |
|---|---|---|
| EP | 0704788 | 4/1996 |
| GB | 2335294 | 9/1999 |
| GB | 2346761 | 8/2000 |

* cited by examiner

*Primary Examiner*—Erika A. Gary
(74) *Attorney, Agent, or Firm*—Jones Day

(57) ABSTRACT

A personal digital assistant (PDA) enabled telephony system is provided comprising a telephone set having a communication port and a personal digital assistant. The personal assistant includes a user interface for displaying telephony functions to a user; a detector for detecting a selected telephony function; a telephony application for determining a call command based on the selected telephony function; and a communicator for communicating said call command to the communication port. In response to receiving the call command, the telephone set executes the selected telephony function.

11 Claims, 4 Drawing Sheets

PDA ENABLED TELEPHONE

RELATED APPLICATIONS

Figure 1:
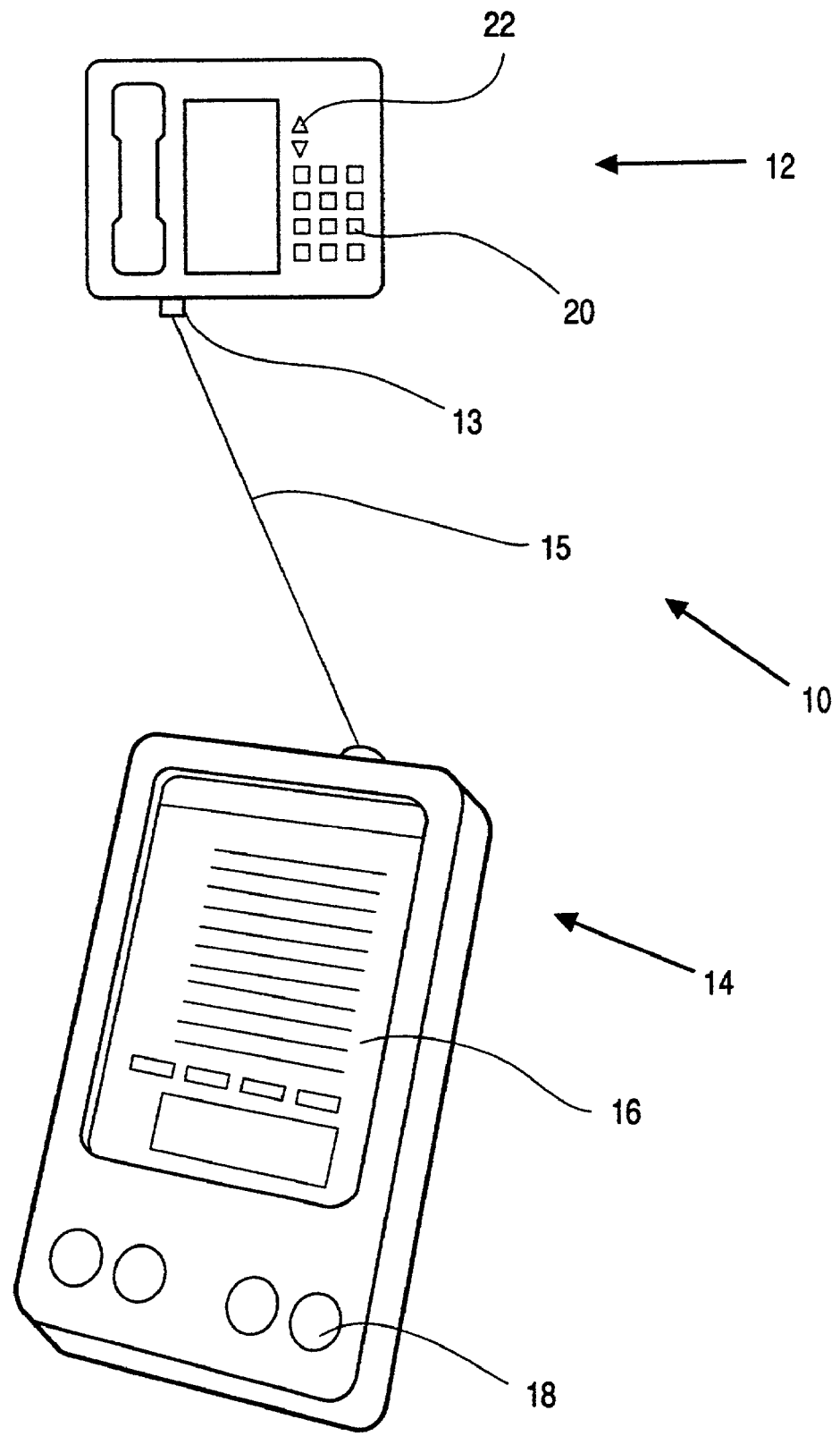

This application claims priority to U.K. Patent Application Serial No. 0102139.3, filed Jan. 27, 2001, which is hereby incorporated by reference.

FIELD OF THE INVENTION

The present invention is directed at a PDA enabled telephone system which eliminates the necessity of a PC and allows the PDA user to control operation of the telephone system directly from the PDA via a telephone set, which functions as a portal to the telephone system. Thus, the user is not required to be at a specific location before using the PDA to dial a telephone number. The PDA controls the telephone system via telephony applications stored within. Moreover, these applications may be downloaded to the PDA.

BACKGROUND OF THE INVENTION

Palm-top or hand-held PDA'such as the Palm Pilot® PC or the Casio® E-10 PDA provide a mobile user with "pocket" applications which are controlled using a pen-based input device, buttons and an LCD output. These devices are enjoying increased popularity because of their lightweight construction and compact design (e.g. the devices can fit easily in a jacket pocket or purse and provide useful features such as contact data bases, address books, schedulers, notepads, etc.).

Quite independently of the palm-top PDAs discussed above, CTI systems are known for integrating telephony features with a PC. For example, the Mitel Personal Assistant® integrated telephony system includes a telephone which is connected to a workstation PC via a serial bus or USB, and software for integrating applications running on the desktop PC with telephony features offered by the attached telephone. Thus, for example, the CTI software can be configured so that when an incoming call is received with CLID (Calling Line Identification), a contacts database is accessed and information about the calling party is displayed while the telephone rings. Or, soft keys can be programmed on the telephone, via the computer, to launch an application on the computer, such as a spreadsheet.

An earlier invention, set forth in U.S. Pat. No. 6,647,0103 to Pinard et al. describes the interconnection of a palm-top PDA or computer to a desktop PC which has an attached telephone under its control. In order to control telephony features via the PDA, a communication protocol is used between the PDA and PC for exchanging messages and commands. The PC then processes the call commands received from the PDA and issues further messages and commands to the telephone using a further protocol which is entirely independent of the protocol used to communicate between the PDA and the PC. This introduces complexities and costs in implementing PDA enabled telephony.

SUMMARY OF THE INVENTION

The present invention is directed at a PDA enabled telephone which eliminates the necessity of a PC and allows the PDA user to control operation of a telephone set directly from the PDA. Thus, any PDA enabled set can be controlled by a PDA and the user is not required to be at a specific location before using the PDA to dial a telephone number. The PDA controls the telephone set via telephony applications stored within. Moreover, these applications may be downloaded to the PDA for use with the PDA enabled telephone set.

In order to facilitate the foregoing, a simplified protocol is established for communicating between application platforms and network portals (e.g. a PDA and a telephone set, a telephone set and a PC, a PDA and a laptop computer, etc.) This simplified protocol allows for a more standard inter-compatible information exchange between such devices than is provided for by the prior art.

An advantage of the present invention is that the telephony application resides directly on the PDA. A call command passes from the PDA to the telephone set and vice versa via the aforenoted protocol to control functions of the telephone set and hence the call server. Information such as numbers to be called, numbers to be assigned to softkeys, the directory number (DN) of the set, etc. is received by or already stored in the PDA and is used by the telephony application to generate a call control command which results in the invocation of a telephony function on the set or call server. The PDA telephony application transfers this command to the telephone set to initiate the telephony feature indicated by the command. It should be noted that the data may originate from an external network, such as the Internet, however, processing of the data (e.g. numbers to be called) takes place on the PDA and is subsequently transferred to the set by the telephony application. Similarly, data from the telephone set may be transferred to the PDA to be stored or displayed on the PDA by an application running on the PDA.

In addition, synchronization of PDA databases and applications with a PC or server based database (i.e. Hot Syncing) is accomplished by communications through the telephone, which, as discussed above, functions as a network portal.

BRIEF DESCRIPTION OF THE DETAILED DRAWINGS

Figure 2:
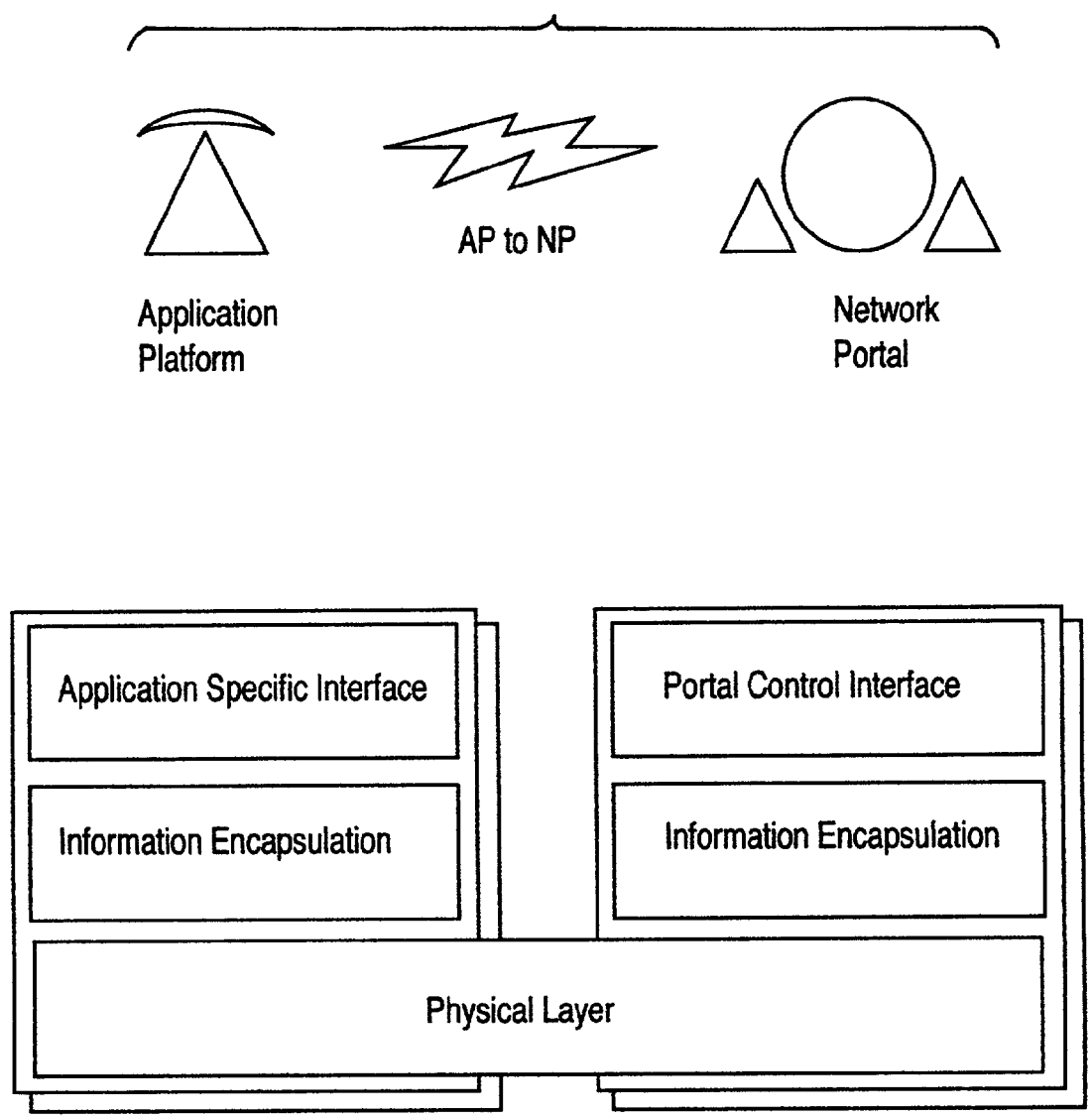
Figure 3:
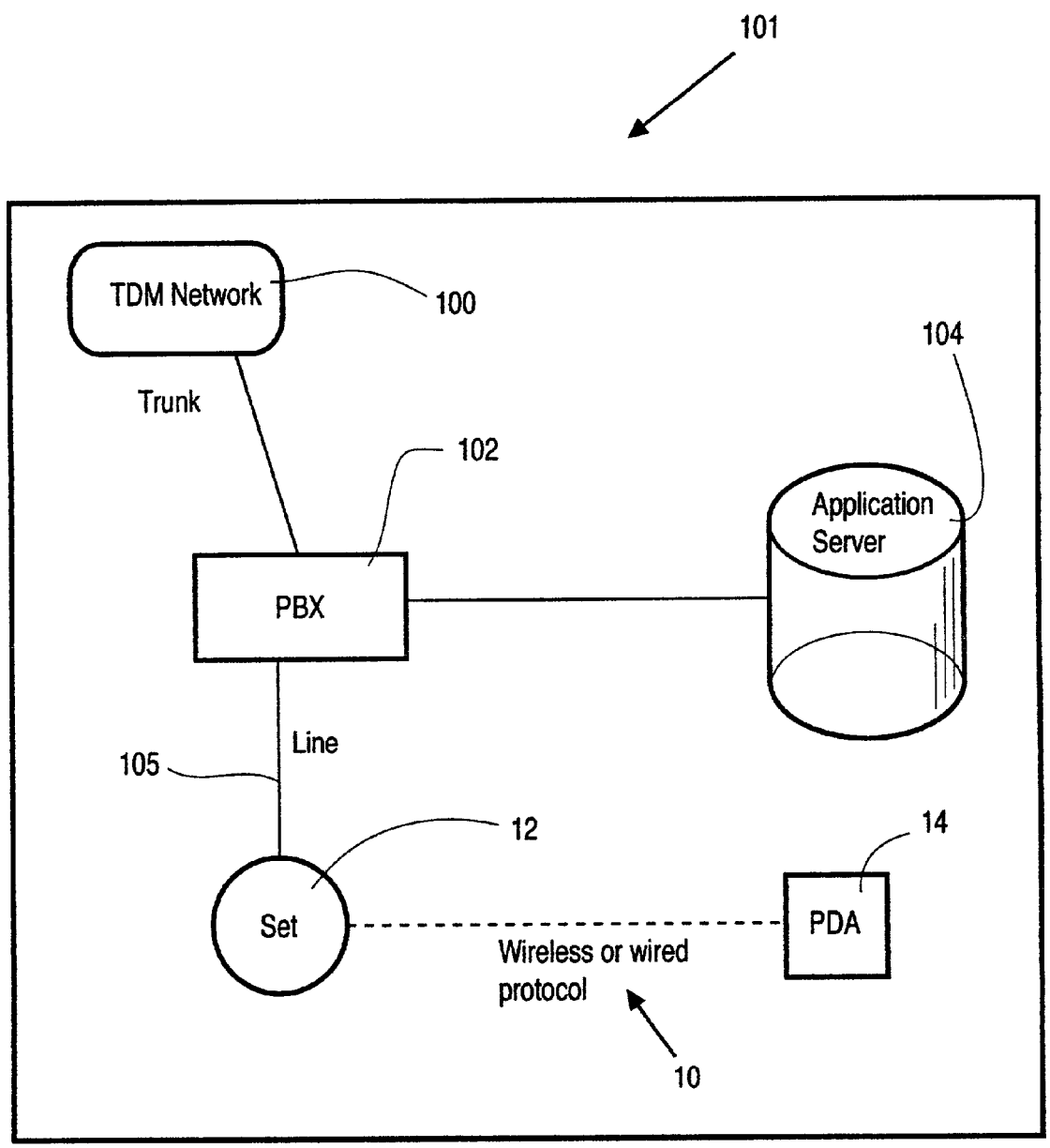
Figure 4:
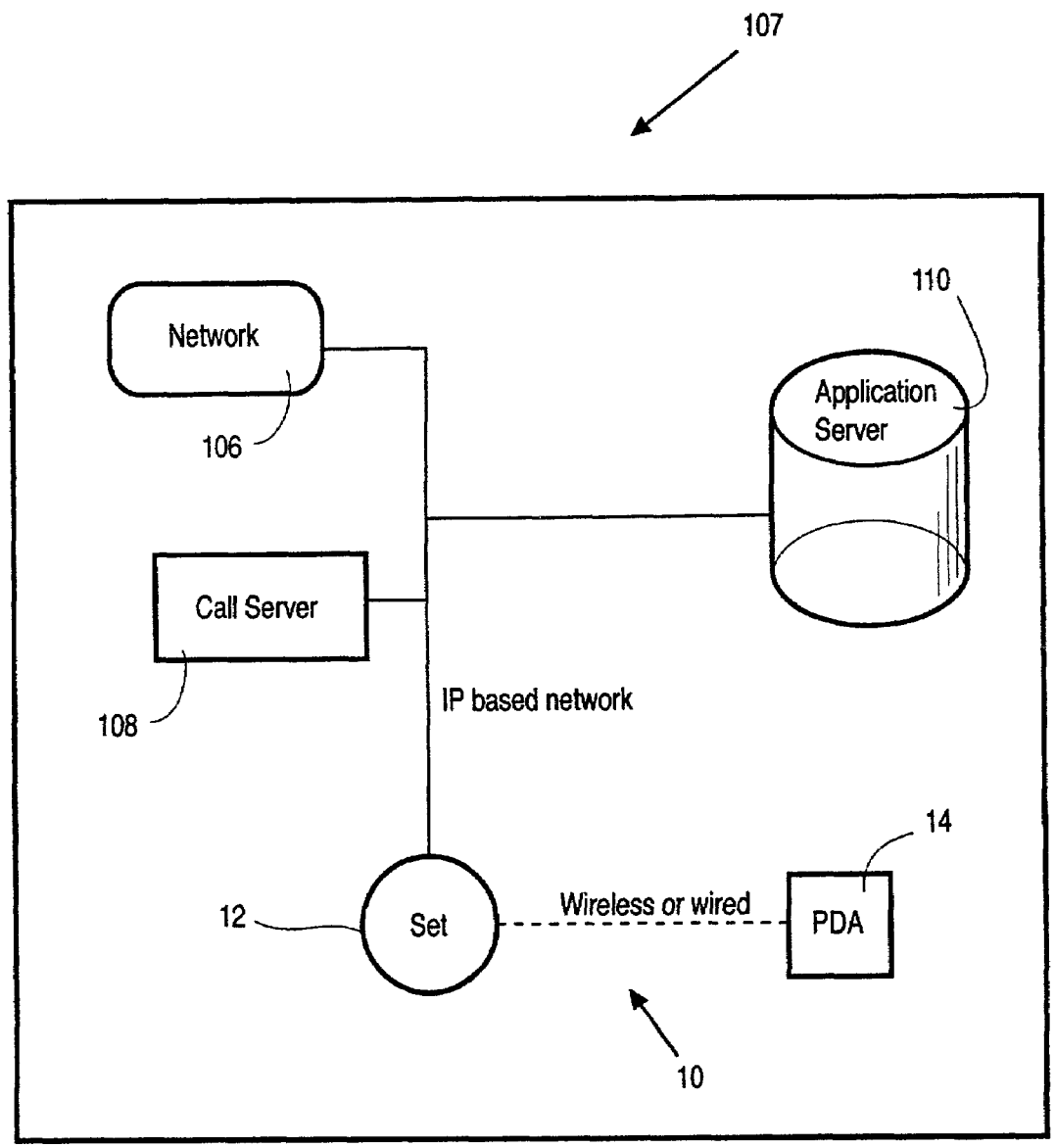

Embodiments of the present invention will now be described with reference to the accompanying drawings in which:

FIG. 1 shows a preferred embodiment of a PDA enabled telephone system in accordance with the present invention;

FIG. 2 provides at a top portion thereof a block diagram showing a protocol for communications between the PDA and telephone system of FIG. 1 and at a bottom portion thereof a datagram showing the structure of a packet of information exchanged between the PDA and telephone set of FIG. 1;

FIG. 3 is a block diagram of a PDA enabled telephone system in accordance with the present invention implemented within a TDM network configuration; and FIG. 4 is a block diagram of a PDA enabled telephone system in accordance with the present invention implemented within an IP based network.

DETAILED DESCRIPTION OF PREFERRED EMBODIMENTS

The present invention is directed at a personal digital assistant (PDA) enabled telephone system. Turning to FIG. 1, a schematic illustration is provided of a PDA enabled telephone system in accordance with the present invention.

The PDA enabled telephony system 10 comprises a telephone set 12 and a personal digital assistant (PDA) 14. The PDA 14 communicates with the telephone set 12 via a bi-directional serial communication link 15. The communication link may either be a wired connection communication protocol such as USB or RS-232 protocol or a wireless communication protocol such as Bluetooth or IrDA.

The PDA 14 comprises a user interface display 16 as well as a set of buttons 18 for navigation of the PDA 14 by the user. The PDA 14 may also include a writing implement for interacting with the display 16. The telephone set 12 may be either an analog set (POTS), digital set, or IP-phone, and is shown comprising a keypad 20, a pair of control buttons 22 and a port 13 for communicating with the PDA 14. The telephone set 12, in turn, communicates with a voice/data network (not shown) such as a PBX, LAN, Wan, etc.

As discussed briefly above, a simplified protocol is provided for communications between the PDA 14 and telephone set 12, without the requirement of an intermediate PC. The details of this protocol are set forth in co-pending U.S. patent application Ser. No. 10/056,404 entitled "TRANSPORT PROTOCOL FOR APPLICATION PLATFORMS COMMUNICATING VIA NETWORK PORTALS". According to the simplified protocol, a diverse collection of voice and data devices may communicate with each other without complicated protocol conversions as exist in the prior art. More specifically, a protocol mechanism is provided for establishing communications between an application platform and a network portal, on the one hand, and between the network portal and a voice/data network, on the other hand.

An application platform, or AP, is any device that can send and receive voice or data, or a mixture of both, between other AP devices through a network portal within a hybrid voice/data network. In other words, an application platform (AP) is any device used as a terminating device on the hybrid network. Examples of application platforms include the PDA 14 which is the subject of the present invention, as well as telephones, cellular phones, wireless communication devices, computers, terminals, laptops, etc. A network portal, or NP, is a device that acts as a common gateway to the voice/data network for application platforms. Examples of network portals include any AP as set forth above that is configured to act as a NP, as well as wireless receivers/transmitters (base stations), etc. In the context of the present invention, the telephone set 12 functions as an NP. The voice/data network itself is a system of voice or data (or a mixture of both) devices connected together for the purpose of transferring or routing voice/data information to other like devices. Examples of a voice/data network include a LAN, WAN, Internet, Intranet, PBX, Centrex, and Wireless Systems.

Turning now to FIG. 2, a high level representation is provided of the protocol blocks between the application platform and the network portal, for implementation of the PDA enabled telephone set of the present invention. The lowest layer, or physical layer, is common between both devices and is the mechanism by which information is passed. The physical layer can be a wired interface (serial, parallel, USB, etc . . . ) or a wireless interface (infrared/IrDA, Bluetooth, etc . . . ).

The next layer up, information encapsulation, performs two functions:
1. Takes information from the level above, packaging this information with a header containing necessary source/destination information and hands it over to the physical layer.
2. Takes information from the level below, removing the header containing necessary source/destination information and hands the information up to the higher level.

This level of abstraction allows for a more standard inter-compatible information exchange between devices than is provided for by the prior art.

The top layer is specific to the type of device it resides on. In the situation of an application platform device (e.g. the PDA 14), the Application Specific Interface (ASI), controls the formatting of information for use at the destination. The type of formatting is dependent on destination requirements.

On the NP side of the diagram, a Network Portal Control Interface, or NPCI, determines whether or not the information can be processed internally (e.g. within the telephone set 12 or whether the data should be repackaged for use somewhere within the voice/data network. By having this layer, a NP device is able to process any information which is pertinent to itself rather than always re-transmitting and waiting for another device to return it.

Turning to FIG. 3, a TDM communication network is shown. The TDM communication network 101 comprises a TDM network 100, a PBX 102, an application server 104 and the PDA enabled telephony system 10 comprising the telephone set 12 and the PDA 14. The telephony system 10 is connected to the PBX 102 via copper cabling 105. It will be understood that although one telephone is shown, any number of telephones may be included within the TDM communication network 101.

In operation, the user interacts with the PDA 14 to select a telephony function from the display 16. All of the telephony functions are located in a telephony application stored within the PDA 14. It will be understood that this telephony application may be pre-stored within the PDA 14 or downloaded from the application server 104.

An example of a downloadable telephony application is a phone list database which retrieves directory numbers from a corporate database located on the application server 104. The PDA 14 downloads the phone list database from the application server 104 and displays the retrieved numbers on the display 16 to the user who then selects the desired entry to be dialed. Once the user selection is made, the telephony application determines the call command to be sent to the PBX 102 and transmits the call command to the PBX via the telephone set 12 (i.e. the telephone set 12 functions as a network portal in the above-discussed communications protocol). The call control command is specific to the type of PBX 102, but can be characterized by the type of information it contains.

Alternatively, as discussed above, in the event that the telephony command issued by PDA 14 is capable of implementation within the telephone set 12 (e.g. redial), then the set 12, acting as a network portal, recognizes the command and implements it without further transmission.

It will be understood that although any bi-directional serial communication protocol may be used between the PDA 14 and the telephone set 12, the bandwidth must be matched with the amount of data being transferred from the telephony application to the telephone set 12 and vice-versa. Software executing on the telephone set 12 performs post processing of the call command from the PDA 14 before transferring the command to the PBX 102, in accordance with the protocol set forth above. By placing the call control command generation function within the telephony application stored in the PDA 14, upgrades to the user interface, call control functions etc., may be achieved by simply updating the telephony application.

Turning to FIG. 4, an IP based communication system is shown incorporating a PDA enabled telephone. The IP based communication system 107 comprises an IP network 106, a call server 108, an application server 110 as well as the PDA enabled telephony system 10. The PDA 14 issues a call control command to the telephone set 12 and the call server 108 in a manner similar to that described in FIG. 3. In addition, the PDA 14 is capable of accessing any node on the IP network 106 directly from the telephony system 10 without having to route data to the call server 108. Again, the telephony application running on the PDA 14 is responsible for the generation of the call control command transferred to the telephone set 12. The software on the telephone set 12 determines if the command is destined for the call server 108 or a node on the IP network 106. The command is then imbedded in an IP packet containing an address for the desired destination, in accordance with the transport protocol set forth in Applicant's co-pending application set forth above.

In addition to transferring call control data, the IP based PDA enabled telephony system 10 may act as a network portal for any application executing on the PDA 14. Thus, PDA functions such as software downloads and "Hot syncing" of PDA databases to a network database are facilitated by the telephone set 12. By placing this functionality on the set, the user gains mobility as any PDA enabled telephony system 10 in the network can provide connectivity for the PDA 14.

For the IP based PDA enabled telephony system 10, the PDA 14 comprises an IrDA port for communicating with the telephone set 12. The data transferred to the telephone set 12 by the telephony application is in the form of a MINET call control command. MINET is a proprietary call control protocol developed by Mitel Corporation. The telephone set 12 recognizes that any MINET command, except those beginning with a header byte of value D2, are to be sent to the call server 108. The IP based telephony system 10 then embeds the MINET command in an IP packet with a destination address for the call server 108. When the call server 108 receives the packet and interprets the MINET command, the call server 108 executes the embedded MINET call command.

A message originating from the PDA 14 and bound for a node in the network 106 is received by the telephone set 12 as a MINET call control command of type D2 with the specific destination IP address given by the first data bytes of the MINET call control command. As discussed above, the protocol implementing software in the telephone set 12 reads the destination IP address and any other data in the D2 message and forms an IP packet bound for the specified address.

In either case, the source address of the IP message is generated by the set firmware and is distinct from the address of the telephone set 12. This distinct source address allows the call server 108 or the addressed node within the IP network 106 to send return packets to the telephone set 12, or PDA 14.

It will be appreciated that, although embodiments of the invention have been described and illustrated in detail, various changes and modifications may be made. Firstly, a Bluetooth implementation of the PDA enabled set may include a wireless transceiver to the PDA, IP phone and other devices on the wireless desktop. IP access for the PDA is implemented in a manner similar to the method described above except that the MINET call control commands are embedded in IP packets within the PDA & Bluetooth transceiver combination, instead of in the telephone set. The telephone set then acts as a network portal for all Bluetooth devices on the desktop. Another modification is that the PDA enabled telephone set may utilize the RS-232 communication protocol to support PDA applications such as Hot-Sync. Although this scenario is addressed by the Bluetooth wireless solution between the set and the PDA, the wired solution provides for faster development. Also, although only one call command is discussed, it will be understood that a plurality of call commands may be sent from the telephony application to the telephone set. All such changes and modifications may be made without departing from the sphere and scope of the invention as defined by the claims appended herein.

What is claimed is:

1. A personal digital assistant (PDA) enabled telephony system comprising:
    call control means for implementing telephony functions, wherein said call control means comprises one of either a PBX or a call server;
    a telephone set connected to said call control means and having a communication port; and
    a PDA having a user interface for displaying telephony functions to a user, a detector for detecting a selected telephony function, a telephony application for determining a call command based on said selected telephony function, and a communicator for communicating said call command to said communication port;
    wherein said telephone set receives said call command and, in response, passes said selected call command to said call control means for implementing said selected telephony function.

2. The PDA enabled telephony system of claim 1 wherein communication between said telephone set and said PDA is achieved via a protocol implemented via software within each of said telephone set and said PDA.

3. The PDA enabled telephony system of claim 2, wherein said protocol as implemented within said PDA comprises a physical layer for exchanging said call command between said PDA and said telephone set, an application specific interface for formatting said call command for use by said PDA, and a first information encapsulation layer for appending source/destination headers to said call command received from said application specific interface and transmitting same over said physical layer to said telephone set.

4. The PDA enabled telephony system of claim 3, wherein said protocol as implemented within said telephone set comprises said physical layer, a network portal control interface for detecting whether said call command is capable of processing directly within said telephone set and otherwise re-transmits said call command, and a second information encapsulation layer for appending source/destination headers to said call command received from said network portal control interface and transmitting same over said physical layer.

5. The PDA enabled telephony system according to claim 4, wherein said physical layer comprises at least one of a wired interface or wireless interface.

6. The PDA enabled telephony system according to claim 3, wherein said physical layer comprises at least one of a wired interface or wireless interface.

7. The PDA enabled telephony system according to claim 6, wherein said wired interface comprises at least one of a serial interface, parallel interface, USB interface, tip and ring interface.

8. The PDA enabled telephony system according to claim 6, wherein said wireless interface comprises at least one of an infrared/IrDA interface, radio interface, and cellular interface.

9. The PDA enabled telephony system of claim 1 wherein said telephone set includes communication means for enabling communication between said PDA and a call server.

10. The PDA enabled telephony system of claim 9 wherein said communication between said PDA and said call server is via one of either a TDM or IP based communication network.

11. The PDA enabled telephony system of claim 1 wherein said telephone set includes communication means for enabling communication between said PDA and a network node.

* * * * *